US011979330B2

(12) United States Patent
Wang et al.

(10) Patent No.: US 11,979,330 B2
(45) Date of Patent: May 7, 2024

(54) RATE UPDATE ENGINE FOR RELIABLE TRANSPORT PROTOCOL

(71) Applicant: Google LLC, Mountain View, CA (US)

(72) Inventors: Xiaoming Wang, Sunnyvale, CA (US); Prashant Chandra, San Jose, CA (US); Neelesh Bansod, San Jose, CA (US); Nandita Dukkipati, Menlo Park, CA (US); Hassan Wassel, San Jose, CA (US); Gautam Kumar, Moutain View, CA (US); Weihuang Wang, Los Gatos, CA (US); Michael Marty, Madison, WI (US); Nicholas McDonald, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/907,423

(22) Filed: Jun. 22, 2020

(65) Prior Publication Data
US 2021/0399990 A1    Dec. 23, 2021

(51) Int. Cl.
*H04L 47/25* (2022.01)
*H04L 47/12* (2022.01)
*H04L 47/50* (2022.01)

(52) U.S. Cl.
CPC .............. *H04L 47/25* (2013.01); *H04L 47/12* (2013.01); *H04L 47/50* (2013.01)

(58) Field of Classification Search
CPC ......... H04L 47/25; H04L 47/12; H04L 47/50; H04L 47/263; H04L 5/0055; H04L 47/29
See application file for complete search history.

(56) References Cited

U.S. PATENT DOCUMENTS

| 2013/0286879 | A1 | 10/2013 | ElArabawy et al. |
| 2015/0295827 | A1 | 10/2015 | Zhu et al. |
| 2017/0118120 | A1 | 4/2017 | Testicioglu et al. |
| 2020/0084150 | A1* | 3/2020 | Burstein ............... H04L 47/805 |

(Continued)

FOREIGN PATENT DOCUMENTS

| CN | 103763743 A | 4/2014 |
| CN | 108353032 A | 7/2018 |

OTHER PUBLICATIONS

Extended European Search Report for European Patent Application No. 20213878.0 dated Jun. 1, 2021. 9 pages.

(Continued)

*Primary Examiner* — Peter P Chau
(74) *Attorney, Agent, or Firm* — Lerner David LLP

(57) ABSTRACT

A system includes a first processor configured to analyze packets received over a communication protocol system and determine one or more congestion indicators from the analysis of the data packets, the one or more congestion indicators being indicative of network congestion for data packets transmitted over a reliable transport protocol layer of the communication protocol system. The system also includes a rate update engine separate from the packet datapath and configured to operate a second processor to receive the determined one or more congestion indicators, determine one or more congestion control parameters for controlling transmission of data packets based on the received one or more congestion indicators, and output a congestion control result based on the determined one or more congestion control parameters.

20 Claims, 9 Drawing Sheets

(56) References Cited

U.S. PATENT DOCUMENTS

2020/0136972 A1* 4/2020 Nguyen .............. H04L 41/5009
2021/0168076 A1* 6/2021 Han ....................... H04L 49/20

OTHER PUBLICATIONS

Office Action for Chinese Patent Application No. 202011186707.8 dated Jun. 10, 2023. 13 pages.
Office Action for European Patent Application No. 20213878.0 dated Jan. 10, 2024. 7 pages.
Office Action for Chinese Patent Application No. 202011186707.8 dated Mar. 9, 2024. 7 pages.

* cited by examiner

RATE UPDATE ENGINE FOR RELIABLE TRANSPORT PROTOCOL

BACKGROUND

The Internet protocol suite is a set of communication protocols used for servicing data transmissions between two devices communicating information over the Internet or other computer networks. Transmission Control Protocol ("TCP") is a part of the Internet protocol suite that provides for connection-oriented, reliable, and ordered delivery of a stream of data packets between, for example, a web-browser application running on a client device and a web-server application running on a server device over a local or wide area network. Currently, datacenters using communication protocols such as TCP encounter certain issues. For instance, incast is a many-to-one communication pattern commonly found in datacenters, which may result in incast congestion when multiple synchronized computing devices send data to a same receiver computing device in parallel.

BRIEF SUMMARY

The present disclosure provides a programmable congestion control engine that can be used to implement various congestion control routines in order to avoid or alleviate incast congestion at a remote node of a communication network, such as a receiver computing device. The congestion control engine gathers information from the remote node to monitor for congestion, and then may update a rate of packet transmission to the remote node using a rate update engine (RUE). The RUE may be separate from the packet datapath. This offloads the processing required to perform congestion control to hardware or software having sufficient processing capacity, and further allows for flexibility in the type of congestion control algorithm or algorithms that may be used.

One aspect of the present disclosure is directed to a congestion control system including one or more first processors of a first node in a communication network, wherein the one or more processors are communicatively coupled to a packet datapath of the communication network for receiving data packets using a reliable transport protocol, and are configured to analyze the packets received from a second node and determine one or more congestion indicators from the analysis of the data packets, the one or more congestion indicators indicative of network congestion for data packets transmitted to the second node over the reliable transport protocol layer, and a rate update engine separate from the packet datapath, wherein the rate update engine is configured to operate one or more second processors to receive the determined one or more congestion indicators determine one or more congestion control parameters for controlling transmission of data packets to the second node over the communication network based on the received one or more congestion indicators, and output a congestion control result based on the determined one or more congestion control parameters.

In some examples, the one or more first processors may be configured to, in response to occurrence of a packet transmission event, provide the determined one or more congestion indicators to the one or more second processors. The packet transmission event may be one of an acknowledgement message, a non-acknowledge message, or a packet retransmission.

In some examples, the one or more congestion indicators may include at least one of a congestion window, retransmission timeout, round trip delay, a number of packets acknowledged by the second node, a number of retransmissions, or a number of explicit congestion notifications received, for the data packets transmitted to the second node.

In some examples, the rate update engine may include a dedicated hardware engine. The rate update engine, the one or more first processors, and the one or more second processors may be included in a same hardware component.

In some examples, the rate update engine may include memory storing instructions. The memory may further include a first queue configured to queue input data provided from the one or more first processors, and a second queue configured to queue output data provided to the one or more first processors. The first queue may be a first ring buffer having a first head pointer and a first tail pointer. The second queue may be a second ring buffer having a second head pointer and a second tail pointer. The one or more first processors may be configured to push rate update requests to the first ring buffer according to the first tail pointer and to read rate update results from the second ring buffer according to the second head pointer. For each rate update request, the one or more first processors may be configured to determine whether to push the rate update request to the first ring buffer based on at least one of whether an amount of time since a previous rate update exceeds a predetermined latency threshold, or whether a number of ACK packets received for data packets transmitted to the second node exceeds a predetermined throughput threshold. The one or more first processors may be configured to determine a then-current number of rate update requests queued in the first ring buffer, if the then-current number of update requests queued in the first ring buffer is less than a first threshold amount, push the rate update request to the first ring buffer, if the then-current number of update requests queued in the first ring buffer is greater than the first threshold amount and less than a second threshold amount, the amount of time since the previous rate update does not exceed the predetermined latency threshold, and the number of ACK packets received for data packets transmitted to the second node does not exceed the predetermined throughput threshold, avoid the rate update request being pushed to the first ring buffer, if the then-current number of update requests queued in the first ring buffer is greater than the second threshold amount and less than a third threshold amount, and the amount of time since the previous rate update does not exceed the predetermined latency threshold, avoid the rate update request being pushed to the first ring buffer, and if the then-current number of update requests queued in the first ring buffer is greater than the third threshold amount, the at least one of (i) the amount of time since the previous rate update does not exceed the predetermined latency threshold, or (ii) the number of ACK packets received for data packets transmitted to the second node does not exceed the predetermined throughput threshold, avoid the rate update request being pushed to the first ring buffer.

Another aspect of the disclosure is directed to a method including: analyzing, by one or more processors of a first node in a communication protocol system, data packets received over a packet datapath from a second node; determining, by the one or more processors, one or more congestion indicators from the analysis of the data packets, wherein the one or more congestion indicators are indicative of network congestion for data packets transmitted to the second node over a reliable transport protocol layer of the communication protocol system; transmitting, by the one or more processors, the determined one or more congestion indicators to a rate update engine separate from the packet datapath; receiving, by the one or more processors, an congestion control result from the rate update engine based on the determined one or more congestion control parameters; and controlling, by the one or more processors, transmission of data packets to the second node based on the congestion control result.

In some examples, the method may further include generating, by the one or more processors, a rate update request in response to one of receiving an acknowledgement message, receiving a non-acknowledge message, or retransmitting a packet. The method may further include transmitting, by the one or more processors, the rate update request and congestion indicators associated with the rate update request to a first queue of a mailbox mechanism, and obtaining, by the one or more processors, the congestion control result from a second queue of the mailbox mechanism. The method may further include limiting a number of generated rate update requests transmitted to the first queue based at least in part on an available remaining capacity of the first queue.

In some examples, limiting the number of generated rate update requests may involve accessing, by the one or more processors, the available remaining capacity of the first queue, if the available remaining capacity of the first queue is less than a first threshold amount, transmitting, by the one or more processors, the rate update request and the congestion indicators associated with the rate update request to the first queue, if the available remaining capacity of the first queue is greater than or equal to the first threshold amount, determining by the one or more processors, an amount of time elapsed since a most recent rate update, if the amount of time elapsed since the most recent rate update is greater than a predetermined latency threshold, transmitting, by the one or more processors, the rate update request and the congestion indicators associated with the rate update request to the first queue, and if the amount of time elapsed since the most recent rate update is less than or equal to the predetermined latency threshold, avoiding, by the one or more processors, transmitting the rate update request to the first queue, thereby limiting the number of rate update requests transmitted to the first queue.

In some examples, limiting the number of generated rate update requests may involve accessing, by the one or more processors, the available remaining capacity of the first queue, if the available remaining capacity of the first queue is less than a first threshold amount, transmitting, by the one or more processors, the rate update request and the congestion indicators associated with the rate update request to the first queue and if the available remaining capacity of the first queue is greater than or equal to the first threshold amount, determining by the one or more processors, a number of ACK packets received for data packets transmitted to the second node, if the number of ACK packets received is greater than a predetermined throughput threshold, transmitting, by the one or more processors, the rate update request and the congestion indicators associated with the rate update request to the first queue, and if the number of ACK packets received is less than or equal to the predetermined latency threshold, avoiding, by the one or more processors, transmitting the rate update request to the first queue, thereby limiting the number of rate update requests transmitted to the first queue.

In some examples, limiting the number of generated rate update requests may involve accessing, by the one or more processors, the available remaining capacity of the first queue, if the available remaining capacity of the first queue is less than a first threshold amount, transmitting, by the one or more processors, the rate update request and the congestion indicators associated with the rate update request to the first queue, and if the available remaining capacity of the first queue is greater than or equal to the first threshold amount, determining by the one or more processors, an amount of time elapsed since a most recent rate update and a number of ACK packets received for data packets transmitted to the second node, if the available remaining capacity of the first queue is greater than the first threshold amount and less than a second threshold amount, if at least one of the amount of time elapsed since the most recent rate update is greater than a predetermined latency threshold or the number of ACK packets received is greater than a predetermined throughput threshold, transmitting, by the one or more processors, the rate update request and the congestion indicators associated with the rate update request to the first queue, and if the amount of time elapsed since the most recent rate update is less than or equal to than the predetermined latency threshold and the number of ACK packets received is less than or equal to the predetermined latency threshold, avoiding, by the one or more processors, transmitting the rate update request to the first queue, thereby limiting the number of rate update requests transmitted to the first queue, if the available remaining capacity of the first queue is greater than the second threshold amount and less than a third threshold amount, if the amount of time elapsed since the most recent rate update is greater than the predetermined latency threshold, transmitting, by the one or more processors, the rate update request and the congestion indicators associated with the rate update request to the first queue, and if the amount of time elapsed since the most recent rate update is less than or equal to than the predetermined latency threshold, avoiding, by the one or more processors, transmitting the rate update request to the first queue, thereby limiting the number of rate update requests transmitted to the first queue, and if the available remaining capacity of the first queue is greater than the third threshold amount, if the amount of time elapsed since the most recent rate update is greater than a predetermined latency threshold and the number of ACK packets received is greater than the predetermined throughput threshold, transmitting, by the one or more processors, the rate update request and the congestion indicators associated with the rate update request to the first queue; and if at least one of the amount of time elapsed since the most recent rate update is less than or equal to than a predetermined latency threshold or the number of ACK packets received is less than or equal to the predetermined throughput threshold, avoiding, by the one or more processors, transmitting the rate update request to the first queue, thereby limiting the number of rate update requests transmitted to the first queue.

In some examples, the method may further include receiving, by one or more second processors controlled by the rate update engine, the rate update request and congestion indicators associated with the rate update request from the first queue, determining, by the one or more second processors, one or more control parameters for controlling transmission of data packets to the second node based on the received one or more congestion indicators, and outputting, by the one or more second processors, a congestion control result based on the determined one or more congestion control parameters to the second queue.

Yet another aspect of the disclosure is directed to a non-transitory computer-readable medium having stored thereon instructions for controlling one or more processors of a first node in a communication protocol system to perform the steps of: analyzing data packets received over a packet datapath from a second node; determining one or more congestion indicators from the analysis of the data packets, wherein the one or more congestion indicators are indicative of network congestion for data packets transmitted to the second node over a reliable transport protocol layer of the communication protocol system; transmitting the determined one or more congestion indicators to a rate update engine separate from the packet datapath; receiving an congestion control result from the rate update engine based on the determined one or more congestion control parameters; and controlling transmission of data packets to the second node based on the congestion control result.

DETAILED DESCRIPTION

Overview

Figure 1:
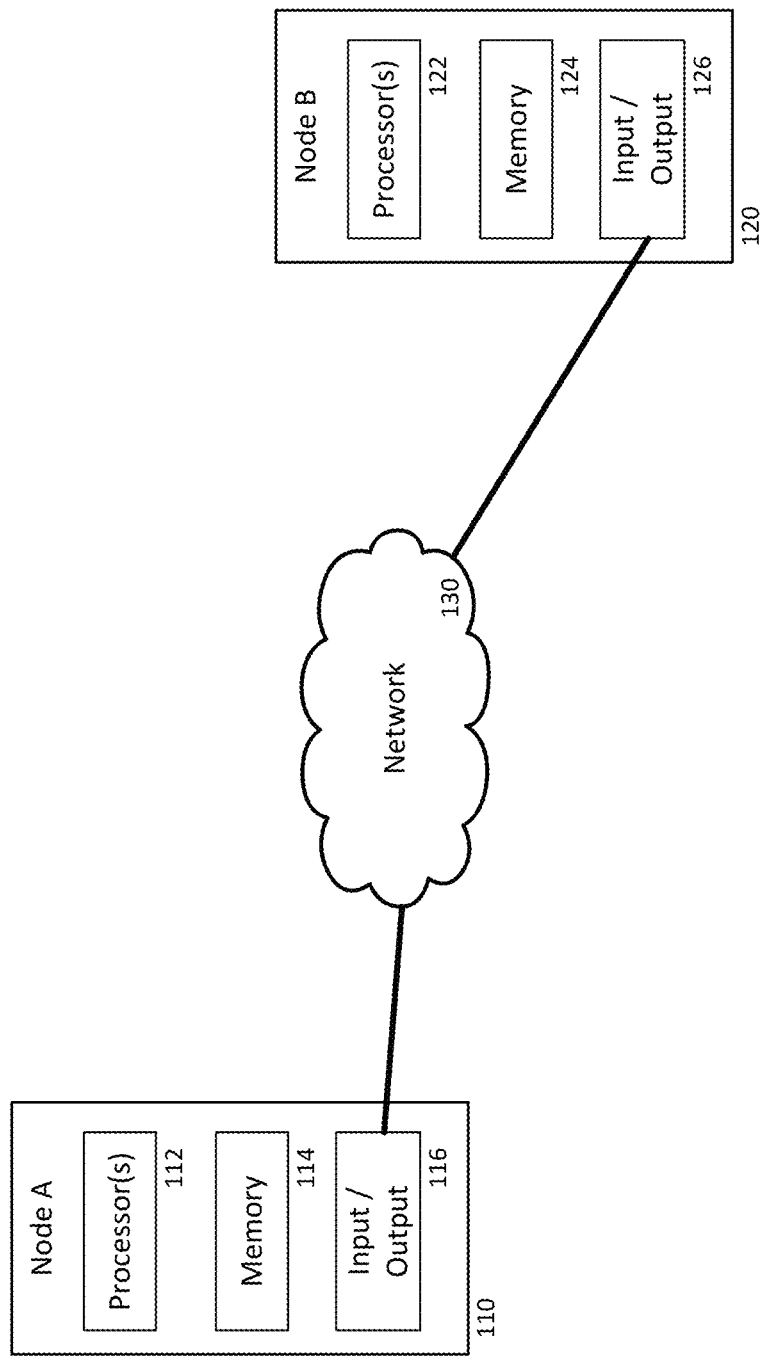
FIG. 1 is a block diagram of an example communication network according to aspects of the disclosure.

The technology relates generally to implementing congestion control for a reliable transport protocol (RTP) layer of a communication protocol system separate from the main datapath of the RTP layer. The main datapath may include one or more first processors for analyzing incoming packets and determining when to initiate a rate update event. The first processors may send rate update requests to a rate update engine controlling one or more second processors positioned off of the main datapath. The second processors may execute a rate update algorithm in order to determine control parameters for congestion control. The second processors may then provide the control parameters back to the first processors in order to implement congestion control at the main datapath.

Rate update requests may be triggered by a hardware event, such as an ACK packet, a NACK packet, or a packet retransmission. Any of these events may indicate a change to congestion conditions at a remote node receiving data packets via the RTP layer, which in turn may warrant an update to the congestion controls at the transmitting node.

Execution of the rate update algorithm may be performed off of the main data path by either dedicated hardware or by a software module. In the example of dedicated hardware, the second processors may be included in a dedicated hardware engine that is part of the hardware used to implement RTP in the communication protocol system, including for example the datapath node hardware.

In the example of a software module, the software module may include instructions for implementing the congestion control algorithm at the one or more second processors. A pair of ring buffers may be used to queue data passing between a rate update scheduler of the main datapath and the offline software-based rate update engine.

In examples using a ring buffer to queue data passing from the main datapath to the offline rate update engine, a rate limiter may be used to control the number of rate update requests pushed to the offline rate update engine. Limiting the number of rate update requests may be especially beneficial in those examples where the rate update engine is implemented in software, since the software may be more limited than dedicated hardware as to the number of congestion control events that can be handled. The rate limiter may analyze a remaining capacity of the ring buffer, as well as an importance of adding the rate update request, and may determine whether to push the rate update request to the ring buffer queue based on this information. Importance of a rate update request may be measured according to a latency of the event, throughput of the transmitted data packets, or a combination thereof.

The above implementations can offload processing steps from the main datapath to a separate, offline, location while also providing for robust congestion control. Additionally, offline implementation of congestion control is flexible, since the proposed architecture is not limited to any particular type of congestion control or rate update algorithm. Furthermore, bursts and temporary back pressure between the main datapath and offline engine can be absorbed using a rate limiter to ensure that the main datapath does not stall.

Example Systems

FIG. 1 illustrates an example communication network 100 including one or more nodes. The nodes may represent various computing devices connected to one another via a network connection. In the example of FIG. 1, a first node 110 and a second node 120 are shown as being connected via network 130.

Each of the nodes 110, 120 may include a respective processor 112, 122, memory 114, 124, and communication device 116, 126 for receiving inputs and transmitting outputs.

The processor 112, 122 can be a well-known processor or other lesser-known types of processors. Alternatively, the processor 112, 122 can be a dedicated controller such as an ASIC.

The memory 114, 124 can store information accessible by the processor 112, 122, including data that can be retrieved, manipulated or stored by the processor, instructions that can be executed by the processor, or a combination thereof. The memory 114, 124 may be a type of non-transitory computer readable medium capable of storing information accessible by the processor 110, 120 such as a hard-drive, solid state drive, tape drive, optical storage, memory card, ROM, RAM, DVD, CD-ROM, write-capable, and read-only memories.

Although FIG. 1 functionally illustrates the processor 112, 122 and corresponding memory 114, 124 of each node as being included within a single block, the processor and memory may actually include multiple processors and memories that may or may not be stored within the same physical housing. For example, some of the data and instructions can be stored on a removable CD-ROM and others within a read-only computer chip. Some or all of the instructions and data can be stored in a location physically remote from, yet still accessible by, the processor. Similarly, the processor can actually include a collection of processors, which may or may not operate in parallel.

The communication device 116, 126 for each node of the communication network may facilitate communication between the node and other remote devices that are in communication with the node. The remote devices may include other nodes of the communication network 100, one or more user devices in communication with the node, or any combination thereof. The communication device 116, 126 may be capable of transmitting data to and from other computers such as modems (e.g., dial-up, cable or fiber optic) and wireless interfaces. For example, each node may receive communications via the network connection 130, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

The network connection 130 between the nodes 110 120 of the communication network 100 may support multiple layers of communication protocols implemented by the respective processors 112, 122 of the nodes. For example, each node may support communication using an upper layer protocol ("ULP") and a reliable transport protocol ("RTP").

The ULP may be implemented on any of a number of hardware or software devices, such as Remote Direct Memory Access ("RDMA") or Non-Volatile Memory Express ("NVMe"), and may be responsible for implementing a hardware/software interface, processing of messages, completion notifications, end-to-end flow control, or any combination of the above. The RTP may be used to track receipt of data packets at a target node. For instance, for a data packet pushed to the target node using the RTP, the target node may send an acknowledgment message ("ACK") to confirm receipt and placement of the data packet. Receipt may be delivered over the network connection 130, such as by using either the ULP or the RTP. In other instances, the target node may send a negative acknowledgements ("NACK") to indicate that the target node is not ready to receive the data packet, and that the transmitting node should try resending the data packet at a later time. In the event that a NACK is received, the transmitting node may attempt retransmission of the data packet at a later time. Peer connections may be formed over the network 100 between corresponding protocols of each layer. Additionally, within each node, the ULP of each node may be configured to communicate with the RTP of the other nodes.

The ACK and NACK signals, among other factors, may be indicative of whether there is congestion at the remote node, such as if too many packets are being transmitted to the remote node from one or more transmitting nodes within too short of a duration of time. In order to address congestion, a transmitting node may adjust the rate at which data packets are transmitted to the target node.

Figure 2:
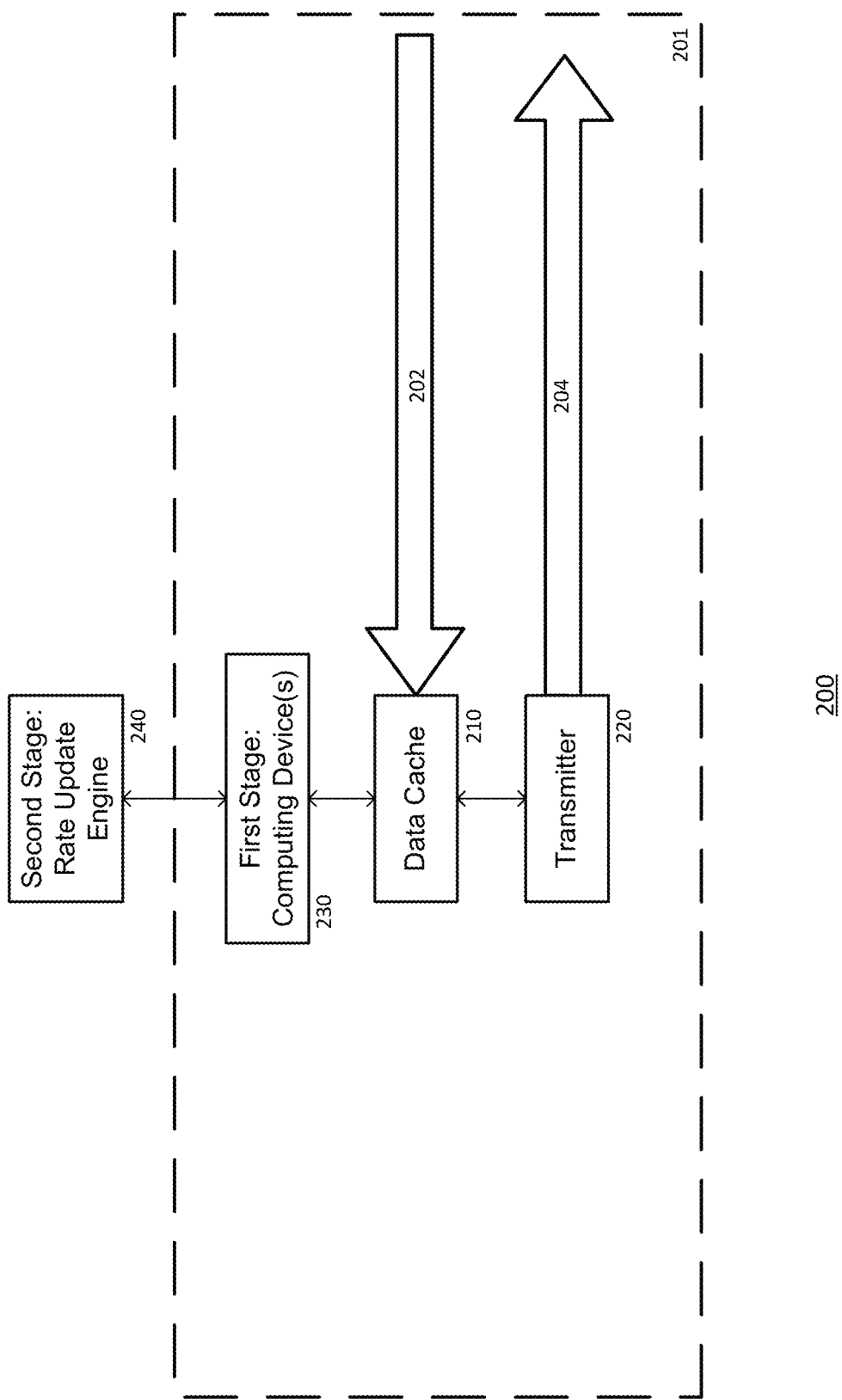
FIG. 2 is a block diagram of an example system according to aspects of the disclosure.

FIG. 2 is a block diagram of a system 200 for congestion control within a communication network, such as the communication network 100 of FIG. 1. The system 200 of FIG. 2 may be included in a first node of the communication network, such as Node A 110 of FIG. 110 of FIG. 1, and may be configured to control congestion at a second node of the communication network, such as Node B 120 of FIG. 1, by gathering information from the second node, and updating a rate of packet transmission to the second node based on the gathered information.

A main datapath 201 is configured to transmit data between the first and second nodes bidirectionally. At the first node, a stream of incoming packets 202 may be received along the main datapath 201 and temporarily stored at the memory of the first node, represented as data cache 210 in FIG. 2. A stream of outgoing packets 204 may be transmitted along the main datapath 201 by the communication device of the first node, represented as a transmitter 220 in FIG. 2.

Data packets received from the second node over the incoming stream 202 and stored at the data cache 210 may be analyzed to determine whether the rate of packet transmission to the second node should be updated. The analysis may be divided into two distinct stages. At a first stage, a determination is made whether to initiate a rate update event. This first stage may be implemented using one or more computing devices 230 included in hardware of the first node and communicatively coupled to the main datapath 201. At a second stage, a determination of the updated parameters for data packet transmission is made in response to initiation of the rate update event. The second stage may be implemented using a rate update engine 204 that is separate from the main datapath 201. For example, data from the incoming stream 201 may be stored separately from the data cache 210, and the rate update engine 240 may analyze the separately stored data in order to determine the updated parameters for data packet transmission. Separating the congestion control process between these two stages helps to offload processing from the main datapath, and thus avoids congestion over the main datapath. Other advantages of offloading the congestion control process include increased flexibility in defining the congestion control algorithm, and in at least some examples increased flexibility in controlling whether rate update events are initiated. These and other aspects of the two-stage congestion control process are described in greater detail herein.

Figure 3:
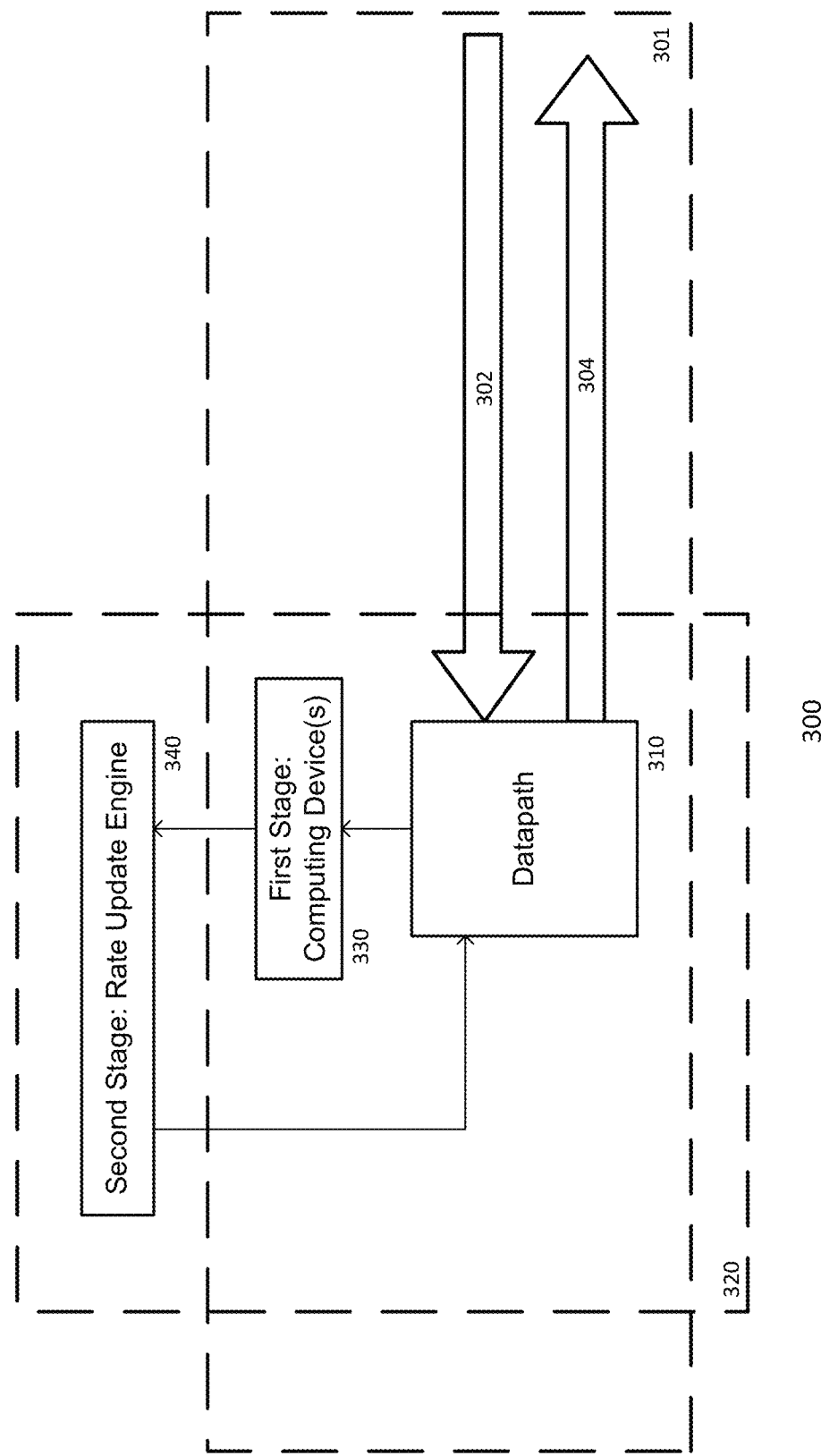
FIG. 3 is a block diagram of an example implementation of the system of FIG. 2.

FIG. 3 is a block diagram of a first example implementation of the system 200 of FIG. 2. In the example implementation of FIG. 3, the cache 210 and transmitter 220 of FIG. 2 are simplified into a single block referred to a "transmit/cache/receive" 310. Block 310 may include comparable functionality to that of the cache 210 and transmitter 220 blocks of FIG. 2, and may transmit and receive incoming and outgoing streams 302, 304 of data packets over the main datapath 301. In some examples, block 310 may be a connection context cache capable of managing and tracking congestion indicators for use in various congestion control algorithms.

In FIG. 3, hardware of the first node is represented by the dashed box 320. As can be seen from FIG. 3, each of the first and second stages of the congestion control system is included in the hardware of the first node. For example, the rate update engine 340 may be a hardware engine executed using processors of the first node and having instructions programmed at a memory of the first node. In this example, data received over the main datapath 301 may be stored in the cache of block 310, which may be a connection context cache. The one or more computing devices 330 of the first stage may analyze the stored data, and in response to the analysis may trigger the rate update engine 340. The rate update engine 340 may then initiate a rate update event in order to conduct congestion control analysis separate from the processing performed at the main datapath 301. A result of the congestion control analysis may then be fed from the rate update engine 340 to block 310 in order to implement updated parameters for data packet transmission.

Figure 4:
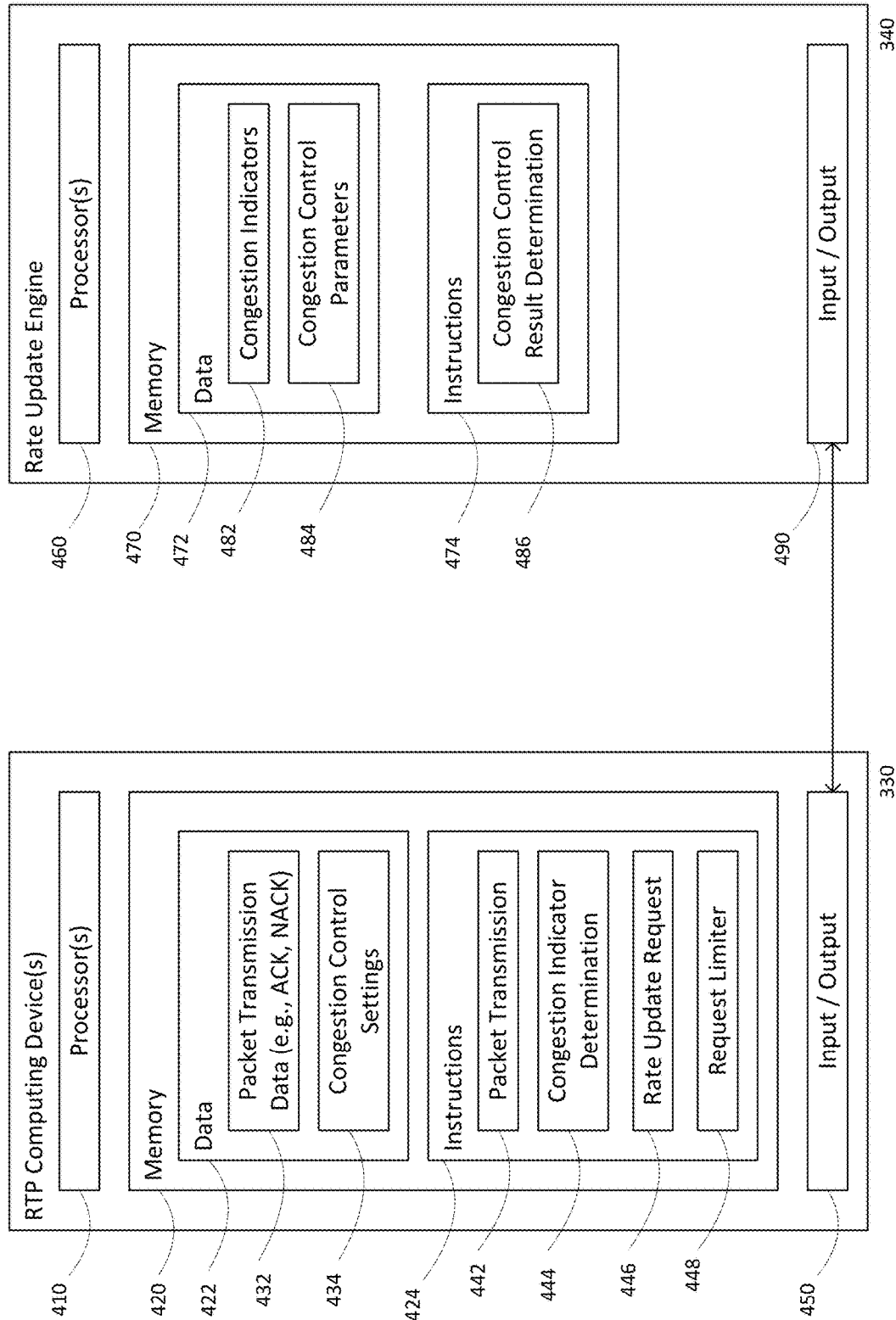
FIG. 4 is a block diagram of example computing devices included in the example system of FIG. 3.

FIG. 4 is a block diagram of example computing devices included in the first node hardware that may be configured to implement the congestion control system 300 of FIG. 3. In the example of FIG. 4, the first stage computing devices 330 may include one or more processors 410, memory 420 and input/output components 450 for receiving and transmitting data with other components included in the first node hardware, such as the rate update engine 340, and components external to the first node. Also, the example of FIG. 4, the second stage rate update engine may include one or more processors 460, memory 470 and input/output components 490 for receiving and transmitting data with other components included in the first node hardware, such as the first stage computing devices 330, and components external to the first node. Although the processors and memory of blocks 330 and 340 are shown as being entirely separate from one another, in some examples, the two blocks may share some or all processors, some or all memory, or any combination thereof.

The memory 420 of the first stage may include instructions 424, and may further include data 422 that can be retrieved, stored or modified by the processor 410 in accordance with the instructions 424. For instance, although the system and method is not limited by a particular data structure, the data 422 can be stored in computer registers, in a data store as a structure having a plurality of different fields and records, or documents, or buffers. The data 422 can also be formatted in a computer-readable format such as, but not limited to, binary values, ASCII or Unicode. Moreover, the data 422 can include information sufficient to identify relevant information, such as numbers, descriptive text, proprietary codes, pointers, references to data stored in other memories, including other network locations, or information that is used by a function to calculate relevant data.

The instructions 424 can be a set of instructions executed directly, such as machine code, or indirectly, such as scripts, by the processor 410. In this regard, the terms "instructions," "steps" and "programs" can be used interchangeably herein. The instructions 424 can be stored in object code format for direct processing by the processor 410, or other types of computer language including scripts or collections of independent source code modules that are interpreted on demand or compiled in advance.

The memory 470 of the second stage can also include data 472 and instructions 474. The data 472 and instructions 474 may operate in accordance with the examples described in connection with the data and instructions of the first stage memory 420.

The processor 410 of the first stage 330 may be capable of accessing packet transmission data 432 from the data 422. The packet transmission data 432 may indicate a second node's response to data packets transmitted from the first node to the second node via the RTP layer. For instance, the packet transmission data 432 may indicate whether an ACK packet or NACK packet is received from the second node.

The processor 410 of the first stage 330 may also be capable of accessing congestion control settings 434 from the data 422. The congestion control settings 434 may be one or more parameters for controlling data transmission between the first node and a remote second node in order to avoid or alleviate congestion at the second node. One example parameter may be an inter-packet gap to limit a number of packets transmitted per round trip time (RTT) between the first and second nodes. For instance, when the second node is determined to be experiencing incast congestion, as indicated by a total number of outstanding packets transmitted to the second node via the RTP layer, the inter-packet gap may be reduced to less than 1 packet per RTT. Another example parameter may be an explicit congestion notification (ECN) received from the second node. The ECN may indicate the presence of congestion at the second node without dropping a packet transmitted by the first node. Another example parameter may be a congestion window size, which may be used to control a number of total outstanding packets per connection, as measured in RTT. Another example parameter may be a retransmission timeout (RTO), which is the amount of time the first node waits before retransmitting a packet to the second node via the RTP layer if an ACK is not received from the second node in response to an initial transmission of the packet.

The instructions 424 may include various algorithms for instructing the processor 410 of the first stage to execute operations in accordance with the routines described herein. For example, the instructions 424 may include a packet transmission routine 442 for sending packets from the first node to the second node via the RTP layer. For further example, the instructions 424 may include a congestion indicator determination routine 444 for assessing congestion at the second node based on data received via the main datapath, such as the packet transmission data 432 and possibly in combination with current congestion control settings 434. For further example, the instructions 424 may include a rate update request routine 446 for triggering the rate update engine to initiate a rate update event. For further example, the instructions 424 may include a request limiter routine 448 for determining whether queue received data for a rate update request based on a remaining available space in a data buffer sending rate update requests to the rate update engine.

The processor 460 of the second stage 340 may be capable of accessing congestion indicators 432 from the data 472. The congestion indicators 432 may be provided by the processing devices of the first stage in order for the rate update engine of the second stage to determine updated parameters for packet transmission to the second node. One example indicator may be a congestion window, which may indicate a total number of outstanding data packets transmitted by the first node to the second node for which an ACK or NACK packet has not been received. Another example indicator may be a round trip delay, which is the time between transmission of the data packet over the RTP layer and receipt of an ACK packet in response. Other example indicators may include a total number of packets acknowledged by the second node, a number of retransmissions, a number of explicit congestion notifications received from the second node, or any combination thereof.

The processor 460 of the second stage 340 may also be capable of storing and accessing congestion control parameters in the data 472. The congestion control parameters may be the parameters used to set the congestion control settings by the computing devices of the first stage 330.

Figure 5:
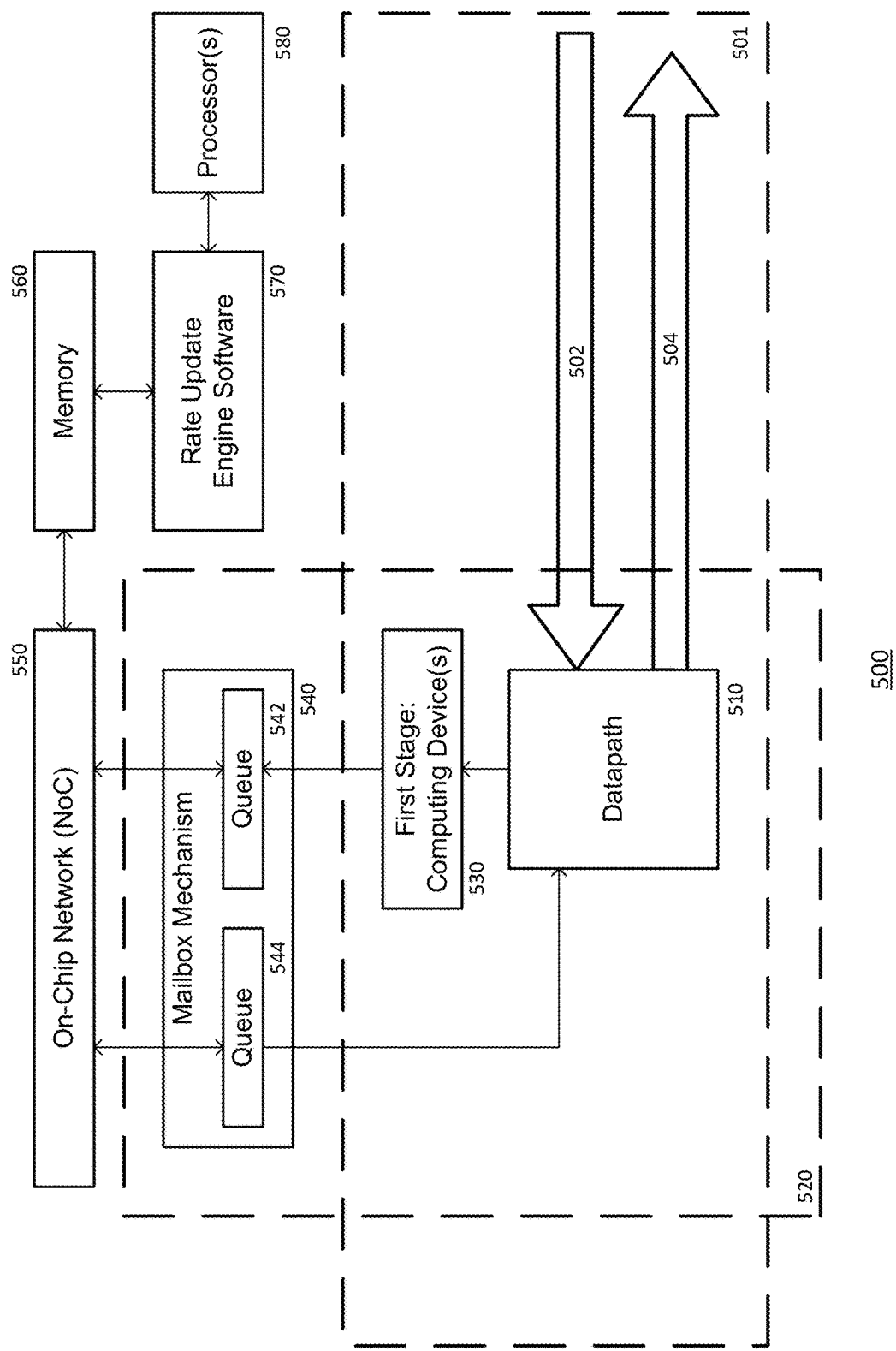
FIG. 5 is a block diagram of another example implementation of the system of FIG. 2

FIG. 5 is a block diagram of a second example implementation of the system 200 of FIG. 2. In the example implementation of FIG. 5, the cache 210 and transmitter 220 of FIG. 2 are simplified into a single block referred to a "transmit/cache/receive" 510. Block 510 may include comparable functionality to that of the cache 210 and transmitter 220 blocks of FIG. 2, and may transmit and receive incoming and outgoing streams 502, 504 of data packets over the main datapath 501.

In FIG. 5, hardware of the first node is represented by the dashed box 520. As can be seen from FIG. 5, the first stage of the congestion control system is included in the hardware of the first node, but at least some of the second stage of the congestion control system is managed by components separate from the hardware of the first node. In particular, the rate update requests are managed by a software module without requiring dedicated hardware, or hardware of the first node, to process the rate update events.

In the example of FIG. 5, the one or more first stage computing devices 530 are connected to a mailbox mechanism 540 in order to forward the rate update request to the separate software module for processing. The mailbox mechanism includes memory for temporarily storing the rate update requests and associated information, such as congestion indicators determined by the first stage computing devices 330. In the example of FIG. 5, the mailbox mechanism 540 includes a first queue 542 or buffer for the temporary storage. A second queue 544 or buffer may also be included in the mailbox mechanism 540 for temporarily storing results of the rate update event so that the results may be fed back to the first node hardware 520 and used to control transmission of data packets along the datapath 501. In the example of FIG. 5, the mailbox mechanism is itself included in the hardware 520 of the first node, although in other examples memory separate from the first node hardware may be used to buffer the incoming stream of rate update results.

In the example of FIG. 5, an on-chip network 550 is used to interface the hardware portion 520 of the system 500 to the software portion. The on-chip network 550 may be connected to memory 560 that is separate from the first node hardware 520 and which the rate update engine software 570 is capable of accessing. The rate update engine software 570 may further have access to one or more processors 580 separate from the first node hardware 520, whereby instructions of the rate update engine software module may control the processors 580 to process the data stored in memory 560 in accordance with a programmed rate update algorithm to derive rate update results from the input data. The interface provided by the on-chip network 550 may be bidirectional for providing the rate update results back to the first node hardware 520.

Figure 6:
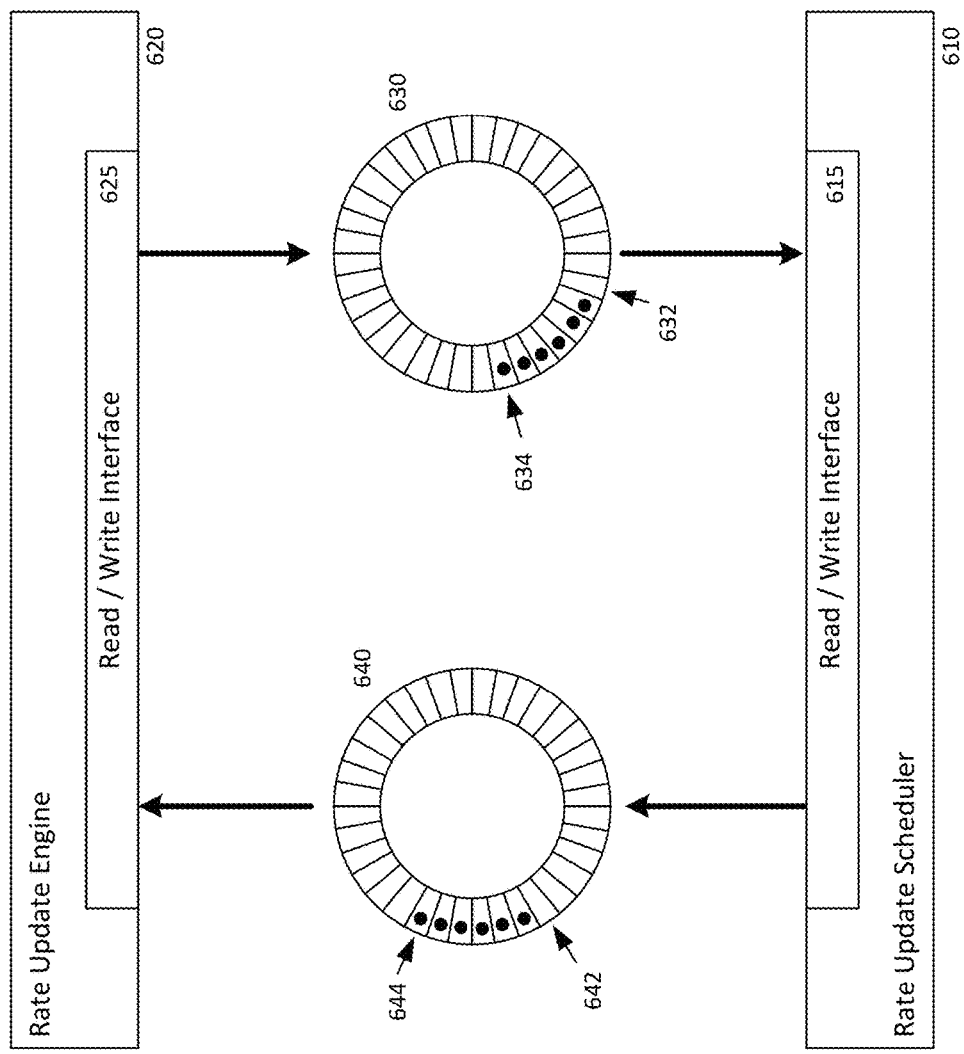
FIG. 6 is a diagram of an example memory included in the example system of FIG. 5.

FIG. 6 is a diagram illustrating an example subsystem 600 for interfacing between a rate update scheduler 610 the first node hardware and a software-based rate update engine 620 that is stored separate from the first node hardware. Memory, such as memory 560 of FIG. 5, may be provided between rate update scheduler 610 and rate update engine 620 in order to temporarily store rate update requests sent from the first node to the software and rate update results fed back from the software to the first node. In the example of FIG. 6, the memory is shown in the form of a first ring buffer 630 for storage of rate update requests and a second ring buffer 640 for storage of rate update results. Each buffer may be configured to function as a queue, whereby information is exchanged from the connection context cache of the first node hardware to the rate update engine software module in sequence, and vice versa. The first buffer is referred to herein as an event queue, and the second buffer as a result queue.

Each buffer 630, 640 may be stored in a memory space associated with the software module 570. The event queue may include a tail pointer 632 for adding rate update requests to the queue, and a head pointer 634 for advancing the queued requests to the software module. Similarly, the result queue may include a tail pointer 642 for adding rate update results to the queue, and a head pointer 644 for advancing the queued results to the first node. Each of the pointers 632, 634, 642, 644, as well as an overall size of each buffer, may be stored in control/status registers of the first node memory so that the read/write interface 615 of the hardware can push requests to and pull results from the correct cells of the respective buffers. The event queue head pointer 634 may also be stored in memory of the read/write interface 625 of the rate update engine 620 can pull requests from the correct cells of the event queue 640. An interface, such as an advanced extendible interface (AXI) may be used to update the pointers stored in the CSRs of the rate update scheduler 610 when requests are pulled from or results are pushed to the respective buffers by the read/write interface 625 of the rate update engine 620. In operation, the head and tail pointers may be advanced by the rate update scheduler 610 and rate update engine 620 as data items are added and removed from the queues, and the AXI write interface may be used to maintain consistency between records in the rate update engine 620 and rate update scheduler 620 memories.

Returning to FIG. 5, the software rate update engine may be implemented on an ARM compute complex (ACC), and may be designed to handle up to 15 million congestion control events per second. By contrast, implementation of the rate update engine as an additional hardware block of the first node can be designed to support as many as 200 million congestion control events. Thus, when congestion control is implemented in software, it may be more necessary to be selective as to what events trigger a rate update event and what events do not trigger a rate update event. Furthermore, because communication between the first node hardware and rate update engine software is maintained by a data buffer having limited memory space, the degree of selectivity as to what events trigger a rate update event and what events do not trigger a rate update event may vary depending on how full the buffer is at a given time.

Figure 7:
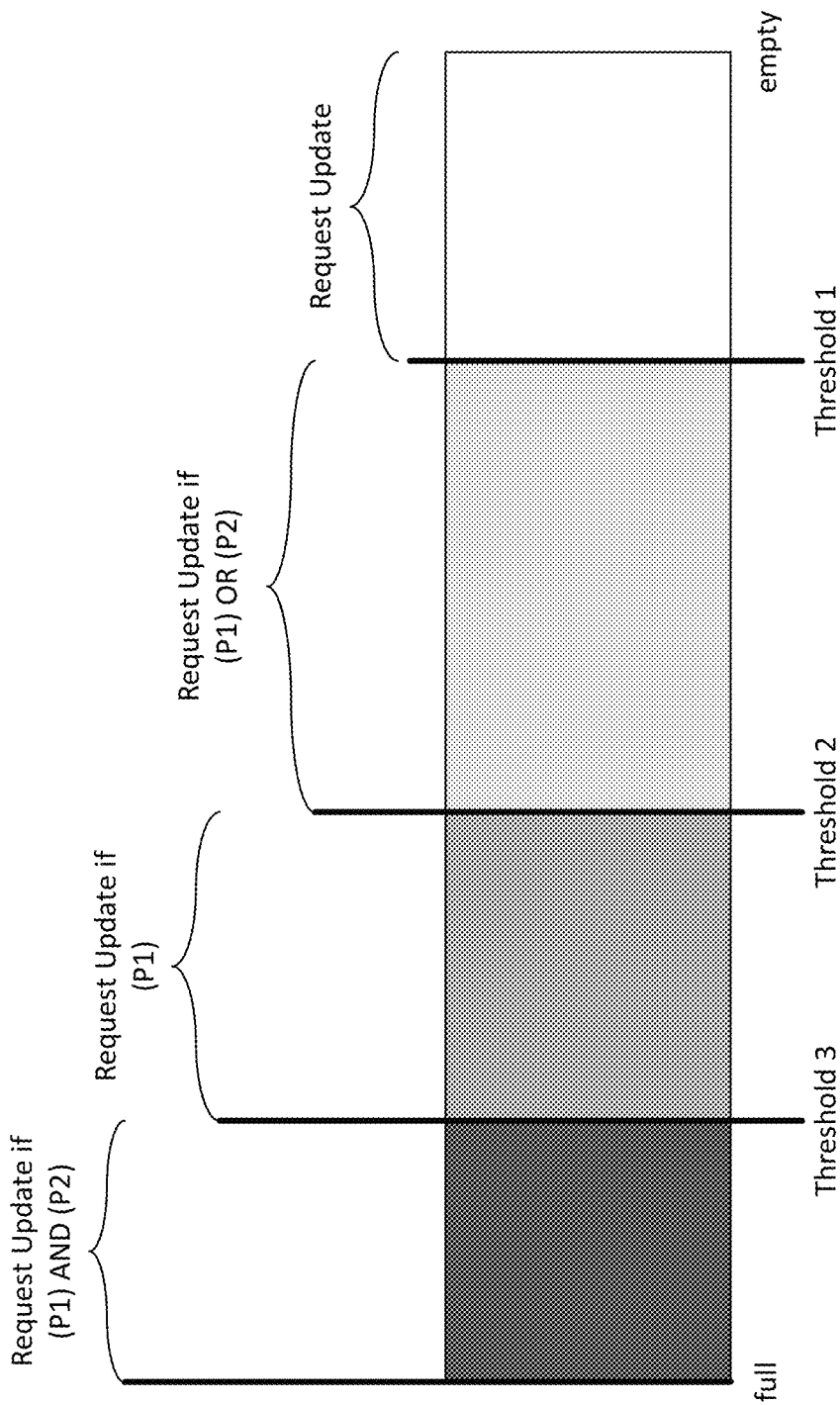
FIG. 7 is a graphical depiction of an example protocol performed by the example system of FIG. 5.

By storing the buffer pointer data and size data in the control/status registers of the first node, it is possible for the first node to track how full the even queue is at a given time and to provide dynamic control over when future events should trigger another rate update event. FIG. 7 illustrates an example routine, previously referred to as a request limiter routine 448 in FIG. 4, for the purpose of limiting requests sent from the rate update scheduler to the rate update engine.

Certain predicates or conditions may be chosen for determining whether a rate update is needed, or more particularly a degree of urgency for a rate update. A first example predicate may be based on an amount of time since a previous rate update request, since the urgency for a new rate update increases as the time since the previous rate update request increases. A second example predicate may be based on an amount of time since a previous ACK packet was received from the second node, since the urgency for a new rate update increases as the time since receiving the previous ACK packet increases. These conditions are referred to as predicate 1 and predicate 2, or P1 and P2 for short, respectively herein.

In the example of FIG. 7, the event queue is illustrated by a horizontal bar, for which the horizontal axis of the bar represents how full the queue is, starting from empty on the right end to full on the left end. The bar is divided into multiple sections, each section being associated with a different set of conditions for pushing a rate update event onto the event queue. A first section is shown between empty and Threshold 1. When a fullness of the queue is between these two amounts, all requests are pushed to the queue. A second section is shown between Threshold 1 and Threshold 2. When a fullness of the queue is between these two amounts, requests may be pushed to the queue if either one of P1 or P2 is true, indicating an urgency for a rate update due either to a time since a previous update or since a previous ACK packet. A third section is shown between Threshold 2 and Threshold 3. When a fullness of the queue is between these two amounts, requests may pushed to the queue when P1 is true, indicating an urgency for a rate update due only to a time since a previous update, regardless of how long it has been since a previous ACK packet was received. A fourth section is shown between Threshold 3 and full. When a fullness of the queue is between these two amounts, even fewer requests may be pushed to the queue to conserve space in the queue, and pushed requests are limited to times when both P1 and P2 are true.

In some examples, the request limiter routine may be run on the software end, whereby all requests may be pushed to the software and then dropped based on varying degrees of urgency as described herein. However, since the software may have limited processing resources, it is often advantageous to operate the request limiter routine from the hardware end instead. This leaves the rate update engine software module free to handle more important events and avoid overrunning the software module's processing power.

Example Methods

The routines executed by the first and second stages of the congestion control system, as well as other routines, are described in greater detail in connection with the diagrams of FIGS. 8 and 9. It should be understood that the routines described herein are merely examples, and in other examples, certain steps may be added, subtracted, replaced or reordered.

Figure 8:
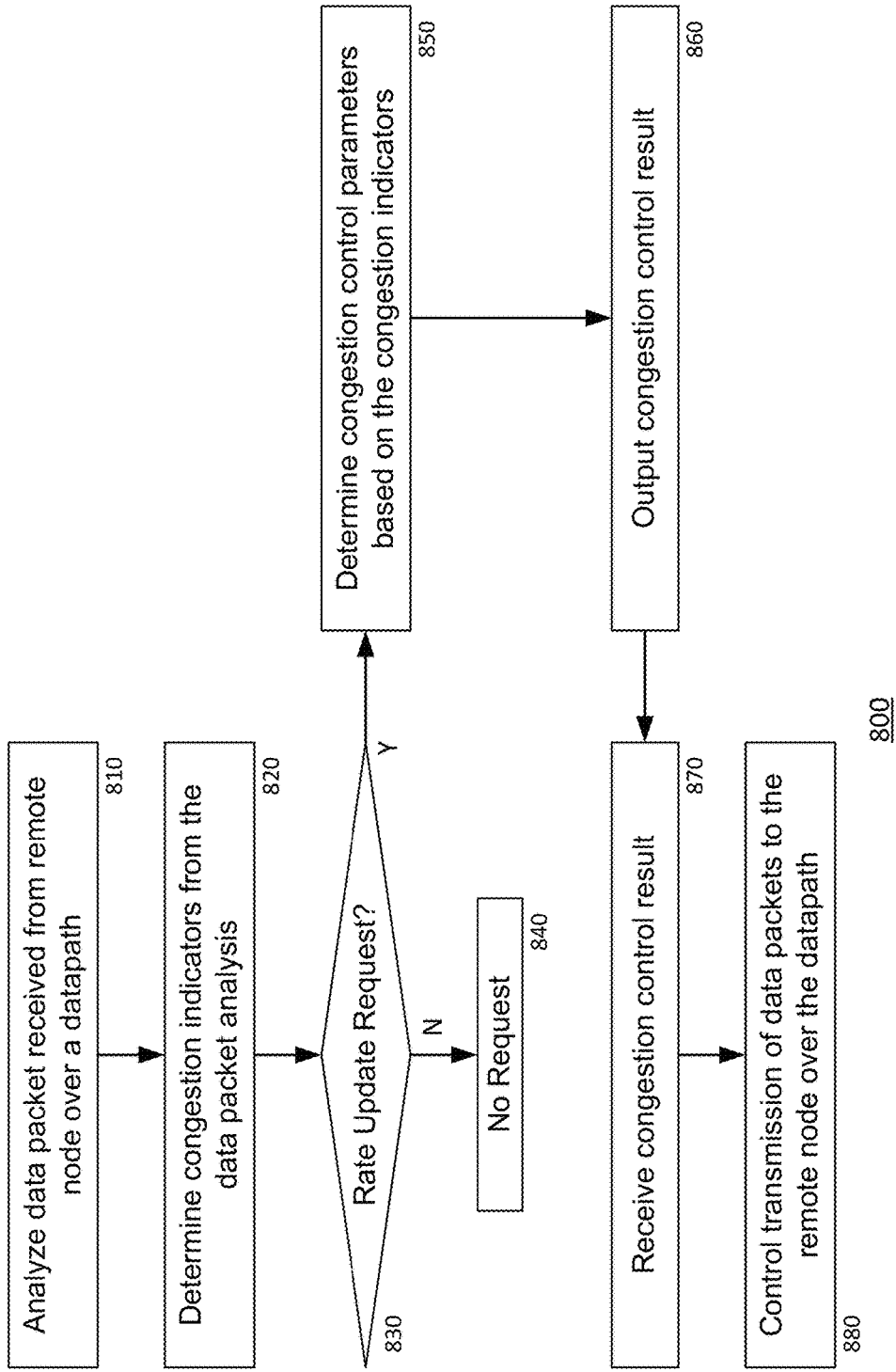
FIG. 8 is a flow diagram of an example rate update routine, according to aspects of the disclosure.

FIG. 8 is a flow diagram illustrating an example routine 800 for congestion control. Certain steps of the routine are described as being performed by one or more processors of the first stage computing devices. Other steps are described as being performed by one or more processors of the second stage computing devices. However, in other example routines, the processors responsible for at least some of these steps may be switched from the first stage to the second stage or vice versa.

At block 810, the one or more processors of the first stage may analyze a data packet received from a remote node over a communication protocol layer. At block 820, the one or more processors of the first stage may determine congestion indicators from the analysis of block 810. Congestion indicators may include, but are not limited to, a congestion window, a round trip delay, a total number of packets acknowledged by the remote node, a number of retransmissions, a number of explicit congestion notifications received from the remote node, or any combination thereof.

At block 830, the one or more processors of the first stage may determine whether to send a rate update request to the second stage. If it is determined to not send a rate update request, then operations end at block 840, with no rate update request being sent, and not rate update event being performed.

Alternatively, if it is determined to send a rate update request, then operations may continue at block 850, whereby the rate update request and congestion indicators may be transmitted from the first stage processors to the one or more processors of the second stage rate update engine. In some implementations, sending a rate update request may involve instructing another hardware module of the first node to process the packet transmission event and congestion indicator. In other implementations, sending a rate update request may involve writing the packet transmission event and congestion indicator to a mailbox queue. This may be accomplished using a coherent mesh network, such as CMN-600, in order to maintain cache coherence throughout the system.

At block 850, the one or more processors of the second stage may determine congestion control parameters based on the congestion indicators. Congestion control parameters may include, but are not limited to, an inter-packet gap, a retransmission timeout, or any combination thereof.

At block 860, the one or more processors of the second stage may output a congestion control result back to the first stage processors for implementation. The congestion control result may include the congestion control parameters determined at block 850 so that the congestion control implementation is performed in accordance with the determined congestion control parameters.

At block 870, the one or more processors of the first stage may receive the congestion control result from the rate update engine. At block 880, the congestion control result may be implemented, whereby the one or more processors of the first stage, which are in communication with the datapath to the remote node, control transmission of data packets to the remote node over the datapath. In the event of an increased inter-packet gap or increased retransmission timeout, the control may result in an overall frequency at which packets are transmitted being reduced. This in turn may alleviate congestion, such as incast congestion, at the remote node. Conversely, in the event of a decreased inter-packet gap or increased retransmission timeout, the control may result in overall connection traffic over the datapath being decreased. This may be the result on congestion, such as incast congestion, at the remote node having been alleviated and connection traffic over the datapath being allowed to increase.

Figure 9:
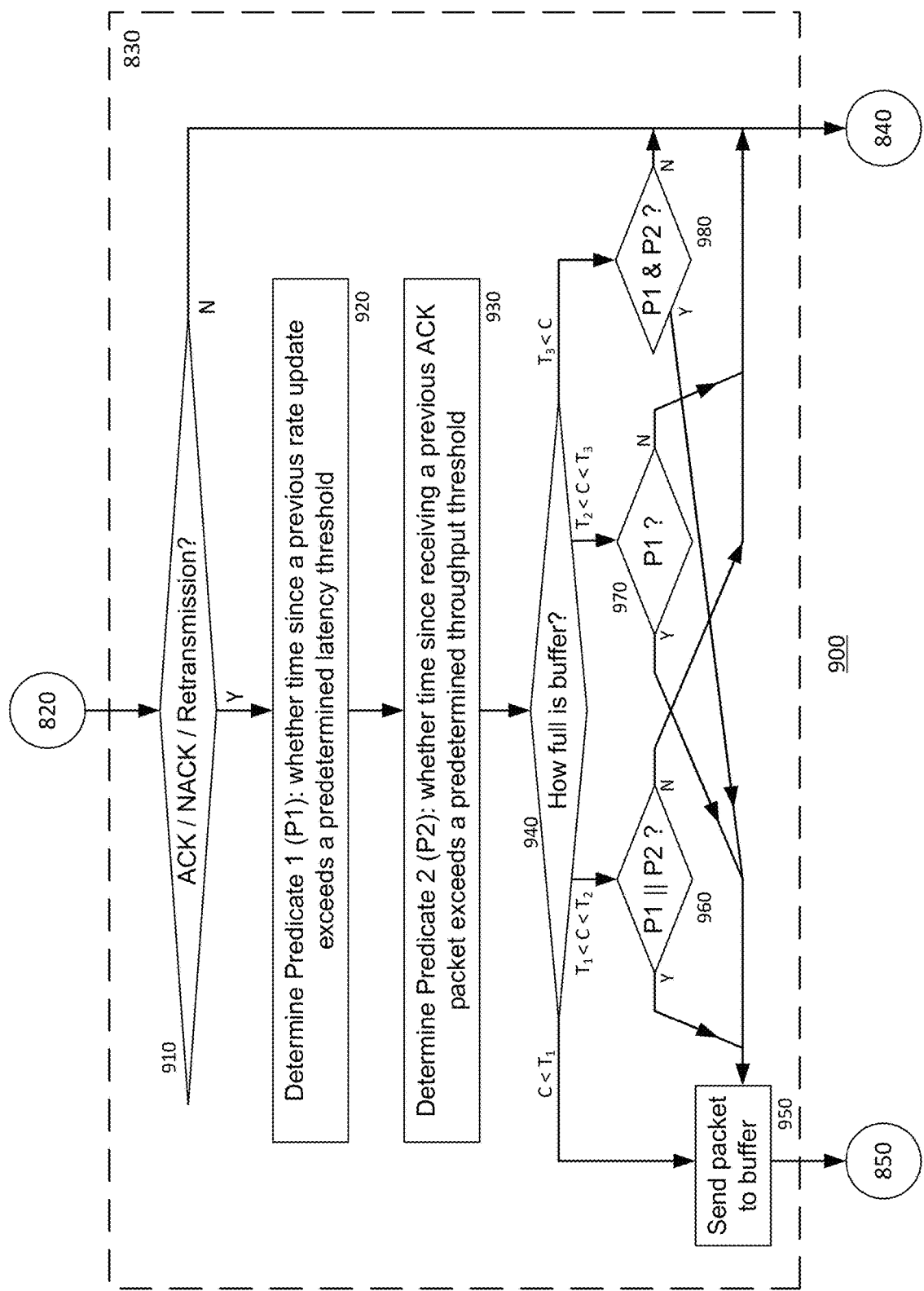
FIG. 9 is a flow diagram of an example rate update request subroutine, according to aspects of the disclosure.

FIG. 9 is a flow diagram illustrating an example subroutine 900 for block 830 of FIG. 8, determining whether to send a rate update request. Operations of routine 900 may proceed from block 820 to continue with the operations of either block 840 or 850 of FIG. 8, depending on the determination.

At block 910, the one or more processors of the first stage may determine whether a packet transmission event has occurred. In some examples, a packet transmission event may include receipt of an ACK packet or a NACK packet from a remote node. Also, in some examples, a packet transmission event may include retransmission of a packet to the remote node, such as in response to receipt of a NACK packet from the remote node concerning the retransmitted packet. If it is determined that a packet transmission event has not occurred, then operations may end at block 840. Alternatively, if it is determined that a packet transmission event has occurred, then operations may optionally continue at block 850, with transmission of the rate update request to the second stage processors.

In some examples, the subroutine 900 may include additional steps for limiting a frequency of rate update requests, particularly when the requests are provided to a rate update engine software module having relatively limited capacity, compared to a hardware implementation at the transmitting node, for performing rate updates.

At block 920, a first condition or predicate may be determined by the one or more processors of the first stage. The first condition may indicate whether time since a previous rate update was performed exceeds a first predetermined threshold, also referred to as a latency threshold.

At block 930, a second condition or predicate may be determined by the one or more processors of the first stage. The first condition may indicate whether time since a previous ACK packet was received from the remote node exceeds a second predetermined threshold, also referred to as a throughput threshold.

At block 940, the one or more processors of the first stage may determine an amount of remaining space in the event queue or buffer for sending rate update requests to the rate update engine. Remaining space may be determined based on information stored in control/status registers of the transmitting node. For instance, in the case of a ring buffer, remaining space may be determined from a difference between buffer size and a distance between head and tail pointers of the ring buffer.

Depending on a determination at block 940, operations may proceed to any of several blocks, each block associated with a different set of predicates or conditions by which it may be determined whether to send a rate update request to the rate update engine. Condition sets may include, but are not limited to: no conditions, the first condition only, the second condition only, either of the first or second conditions, or both the first and second conditions. Additionally, different first and second thresholds may be assigned to different condition sets. For instance, a first latency threshold may be used for rate update event limiting when the buffer is relatively empty, but a longer second latency threshold may be used for rate update event limiting when the buffer is relatively full. For further instance, a first throughput threshold may be used for rate update event limiting when the buffer is relatively empty, but a longer second throughput threshold may be used for rate update event limiting when the buffer is relatively full.

In the particular example of FIG. 9, the subroutine 900 operations are divided among four condition sets.

First condition set: if a capacity C of the buffer is less than a first threshold $T_1$, then operations may proceed at block 950, whereby the one or more processors of the first stage determine to continue operations at block 850 and send the rate update request to the buffer.

Second condition set: if a capacity C of the buffer is more than the first threshold $T_1$ but less than a second threshold $T_2$, then operations may proceed at block 960, whereby the one or more processors of the first stage determine whether either of the first or second conditions, P1 or P2, has been met. If either P1 or P2 has been met, then operations may continue at blocks 950 and then 850 as described above. Otherwise, if neither P1 nor P2 has been met, then operations may end at block 840.

Third condition set: if a capacity C of the buffer is more than the second threshold $T_2$ but less than a third threshold $T_3$, then operations may proceed at block 970, whereby the one or more processors of the first stage determine whether the first condition, P1, has been met. If P1 has been met, then operations may continue at blocks 950 and then 850 as described above. Otherwise, if P1 has not been met, then operations may end at block 840.

Fourth condition set: if a capacity C of the buffer is more than the third threshold $T_3$, then operations may proceed at block 990, whereby the one or more processors of the first stage determine whether both the first and second conditions, P1 and P2, have been met. If P1 and P2 have been met, then operations may continue at blocks 950 and then 850 as described above. Otherwise, if P1 and P2 have not both been met, then operations may end at block 840.

For each of the instances in which operations end at block 840, ending operations may cause for fewer rate update requests to be sent to the offline engine. This may allow the system to absorb bursts and temporary back pressure between the main datapath and offline engine, in turn ensuring that the main datapath does not stall.

The routines of FIGS. 8 and 9 may be initiated repeatedly by the one or more processors of the first stage computing devices. For instance, the routines may be initiated every time a data packet is received over the datapath from the remote node.

The above described routines may be advantageous for offloading congestion control algorithms in generally, and more specifically offloading processing rate update result determination, from the main datapath of a communication protocol, leaving other processing blocks of the communicating node's hardware or a connected software module to perform the processing instead. Additionally, because the congestion control algorithms are separating from the hardware of the main datapath, the assigned congestion control engine can more easily be adapted and designed to perform any of a number of congestion control protocols, including but not limited to GCN, Swift or BBR protocols.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A congestion control system comprising:
    one or more first processors of a first node in a communication network, wherein the one or more first processors are communicatively coupled to a packet datapath of the communication network for receiving data packets using a reliable transport protocol and are configured to:
        analyze the data packets received from a second node;
        determine one or more congestion indicators from the analysis of the data packets, the one or more congestion indicators indicative of network congestion for data packets transmitted to the second node over a reliable transport protocol layer;
        generate a rate update request based on the analysis of the data packets, wherein the rate update request is associated with the one or more congestion indicators; and
        transmit the rate update request with the one or more congestion indicators;
    a rate update engine separate from the packet datapath, wherein the rate update engine is interfaced with the one or more first processors by a network-on-a-chip; and
    a buffer between the one or more first processors and the network-on-a-chip and having a preset capacity, wherein communications through the network-on-a- chip from the one or more first processors to the rate update engine are temporarily stored at the buffer, wherein the one or more first processors are configured to rate limit rate update requests transmitted by the one or more first processors to the rate update engine based at least in part on a remaining available capacity of the buffer, and wherein the rate update engine is configured to operate one or more second processors to:
- receive the rate update request and the one or more congestion indicators transmitted by the one or more first processors;
- determine one or more congestion control parameters for controlling transmission of data packets to the second node over the communication network based on the received one or more congestion indicators; and
- output a congestion control result based on the determined one or more congestion control parameters.

2. The system of claim 1, wherein the one or more first processors are configured to, in response to occurrence of a packet transmission event, generate the rate update request.

3. The system of claim 2, wherein the packet transmission event is one of an acknowledgement message, a non-acknowledge message, or a packet retransmission.

4. The system of claim 1, wherein the one or more congestion indicators include at least one of a congestion window, retransmission timeout, round trip delay, a number of packets acknowledged by the second node, a number of retransmissions, or a number of explicit congestion notifications received, for the data packets transmitted to the second node.

5. A congestion control system comprising:
- one or more first processors included in a first node of a communication network, wherein the one or more first processors are communicatively coupled to a packet datapath of the communication network for receiving data packets using a reliable transport protocol and are configured to:
  - analyze the data packets received from a second node;
  - determine one or more congestion indicators from the analysis of the data packets, the one or more congestion indicators indicative of network congestion for data packets transmitted to the second node over a reliable transport protocol layer;
  - generate a rate update request based on the analysis of the data packets; and
  - transmit the rate update request with the one or more congestion indicators;
- a rate update engine included in the first node of the communication network and separate from the packet datapath, wherein the rate update engine comprises one or more second processors configured to:
  - receive the rate update request and the one or more congestion indicators from the one or more first processors;
  - determine one or more congestion control parameters for controlling transmission of data packets to the second node over the communication network based on the received one or more congestion indicators; and
  - output a congestion control result based on the determined one or more congestion control parameters.

6. The system of claim 5, wherein the rate update engine comprises a dedicated hardware engine.

7. The system of claim 1, wherein the rate update engine comprises memory storing instructions, wherein the memory further includes:
- the buffer, wherein the buffer is a first queue configured to queue input data provided from the one or more first processors; and
- a second queue configured to queue output data provided to the one or more first processors.

8. The system of claim 7, wherein the first queue is a first ring buffer having a first head pointer and a first tail pointer, wherein the second queue is a second ring buffer having a second head pointer and a second tail pointer.

9. The system of claim 8, wherein the one or more first processors are configured to push rate update requests to the first ring buffer according to the first tail pointer and to read rate update results from the second ring buffer according to the second head pointer.

10. The system of claim 9, wherein, for a second rate update request, the one or more first processors are configured to determine whether to push the second rate update request to the first ring buffer based on at least one of:
- whether an amount of time since a previous rate update exceeds a predetermined latency threshold; or
- whether a number of acknowledgement (ACK) packets received for data packets transmitted to the second node exceeds a predetermined throughput threshold.

11. The system of claim 10, wherein the one or more first processors are configured to:
- determine a number of rate update requests queued in the first ring buffer;
- when the number of update requests queued in the first ring buffer is less than a first threshold amount, push the second rate update request to the first ring buffer;
- when the number of update requests queued in the first ring buffer is greater than the first threshold amount and less than a second threshold amount, the amount of time since the previous rate update does not exceed the predetermined latency threshold, and the number of ACK packets received for data packets transmitted to the second node does not exceed the predetermined throughput threshold, avoid the second rate update request being pushed to the first ring buffer;
- when the number of update requests queued in the first ring buffer is greater than the second threshold amount and less than a third threshold amount, and the amount of time since the previous rate update does not exceed the predetermined latency threshold, avoid the second rate update request being pushed to the first ring buffer; and
- when the number of update requests queued in the first ring buffer is greater than the third threshold amount and the at least one of (i) the amount of time since the previous rate update does not exceed the predetermined latency threshold, or (ii) the number of ACK packets received for data packets transmitted to the second node does not exceed the predetermined throughput threshold, avoid the second rate update request being pushed to the first ring buffer.

12. A method comprising:
- analyzing, by one or more processors of a first node in a communication protocol system, data packets received over a packet datapath from a second node;
- determining, by the one or more processors, one or more congestion indicators from the analysis of the data packets, wherein the one or more congestion indicators are indicative of network congestion for data packets transmitted to the second node over a reliable transport protocol layer of the communication protocol system;

generating, by the one or more processors, a rate update request in response to one of receiving an acknowledgement message, receiving a non-acknowledge message, or retransmitting a packet;

transmitting, by the one or more processors, the rate update request with the determined one or more congestion indicators through a first queue to a rate update engine separate from the packet datapath;

limiting, by the one or more processors, a number of generated rate update requests transmitted to the first queue based at least in part on an available remaining capacity of the first queue;

receiving, by the one or more processors, a congestion control result from the rate update engine based on the determined one or more congestion control indicators; and controlling, by the one or more processors, transmission of data packets to the second node based on the congestion control result.

13. The method of claim 12, further comprising:
transmitting, by the one or more processors, the rate update request and congestion indicators associated with the rate update request to the first queue of a mailbox mechanism; and obtaining, by the one or more processors, the congestion control result from a second queue of the mailbox mechanism.

14. The method of claim 12, wherein the limiting the number of generated rate update requests comprises:
accessing, by the one or more processors, the available remaining capacity of the first queue;

when the available remaining capacity of the first queue is less than a first threshold amount, transmitting, by the one or more processors, a second rate update request and congestion indicators associated with the second rate update request to the first queue; and when the available remaining capacity of the first queue is greater than or equal to the first threshold amount:
determining by the one or more processors, an amount of time elapsed since a most recent rate update;

when the amount of time elapsed since the most recent rate update is greater than a predetermined latency threshold, transmitting, by the one or more processors, the second rate update request and the congestion indicators associated with the second rate update request to the first queue; and when the amount of time elapsed since the most recent rate update is less than or equal to the predetermined latency threshold, avoiding, by the one or more processors, transmitting the second rate update request to the first queue, thereby limiting the number of generated rate update requests transmitted to the first queue.

15. The method of claim 12, wherein the limiting the number of generated rate update requests comprises:
accessing, by the one or more processors, the available remaining capacity of the first queue;

when the available remaining capacity of the first queue is less than a first threshold amount, transmitting, by the one or more processors, a second rate update request and congestion indicators associated with the second rate update request to the first queue; and when the available remaining capacity of the first queue is greater than or equal to the first threshold amount:

determining by the one or more processors, a number of acknowledgement (ACK) packets received for data packets transmitted to the second node;

when the number of ACK packets received is greater than a predetermined throughput threshold, transmitting, by the one or more processors, the second rate update request and the congestion indicators associated with the second rate update request to the first queue; and when the number of ACK packets received is less than or equal to the predetermined throughput threshold, avoiding, by the one or more processors, transmitting the second rate update request to the first queue, thereby limiting the number of generated rate update requests transmitted to the first queue.

16. The method of claim 12, wherein the limiting the number of generated rate update requests comprises:
accessing, by the one or more processors, the available remaining capacity of the first queue;

when the available remaining capacity of the first queue is less than a first threshold amount, transmitting, by the one or more processors, a second rate update request and congestion indicators associated with the second rate update request to the first queue; and when the available remaining capacity of the first queue is greater than or equal to the first threshold amount:
determining by the one or more processors, an amount of time elapsed since a most recent rate update and a number of acknowledgement (ACK) packets received for data packets transmitted to the second node;

when the available remaining capacity of the first queue is greater than the first threshold amount and less than a second threshold amount:
when at least one of the amount of time elapsed since the most recent rate update is greater than a predetermined latency threshold or the number of ACK packets received is greater than a predetermined throughput threshold, transmitting, by the one or more processors, the second rate update request and the congestion indicators associated with the second rate update request to the first queue; and when the amount of time elapsed since the most recent rate update is less than or equal to than the predetermined latency threshold and the number of ACK packets received is less than or equal to the predetermined throughput threshold, avoiding, by the one or more processors, transmitting the second rate update request to the first queue, thereby limiting the number of generated rate update requests transmitted to the first queue;

when the available remaining capacity of the first queue is greater than the second threshold amount and less than a third threshold amount:
when the amount of time elapsed since the most recent rate update is greater than the predetermined latency threshold, transmitting, by the one or more processors, the second rate update request and the congestion indicators associated with the second rate update request to the first queue; and when the amount of time elapsed since the most recent rate update is less than or equal to than the predetermined latency threshold, avoiding, by the one or more processors, transmitting the second rate update request to the first queue, thereby limiting the number of generated rate update requests transmitted to the first queue; and when the available remaining capacity of the first queue is greater than the third threshold amount:

when the amount of time elapsed since the most recent rate update is greater than a predetermined latency threshold and the number of ACK packets received is greater than the predetermined throughput threshold, transmitting, by the one or more processors, the second rate update request and the congestion indicators associated with the second rate update request to the first queue; and when at least one of the amount of time elapsed since the most recent rate update is less than or equal to than a predetermined latency threshold or the number of ACK packets received is less than or equal to the predetermined throughput threshold, avoiding, by the one or more processors, transmitting the second rate update request to the first queue, thereby limiting the number of generated rate update requests transmitted to the first queue.

17. The method of claim 12, further comprising:

receiving, by one or more second processors of the rate update engine, the rate update request and the one or more congestion indicators from the first queue;

determining, by the one or more second processors, one or more control parameters for controlling transmission of data packets to the second node based on the received one or more congestion indicators; and outputting, by the one or more second processors, a congestion control result based on the determined one or more congestion control parameters to the second queue.

18. A non-transitory computer-readable medium having stored thereon instructions for controlling one or more processors of a first node in a communication protocol system to perform steps of:

analyzing data packets received over a packet datapath from a second node;

determining one or more congestion indicators from the analysis of the data packets, wherein the one or more congestion indicators are indicative of network congestion for data packets transmitted to the second node over a reliable transport protocol layer of the communication protocol system;

generating a rate update request in response to one of receiving an acknowledgement message, receiving a non-acknowledge message, or retransmitting a packet;

transmitting the rate update request with the determined one or more congestion indicators through a queue to a rate update engine separate from the packet datapath;

limiting, by the one or more processors, a number of generated rate update requests transmitted to the queue based at least in part on an available remaining capacity of the queue;

receiving a congestion control result from the rate update engine based on the determined one or more congestion control indicators; and controlling transmission of data packets to the second node based on the congestion control result.

19. The system of claim 1, wherein the rate update engine is configured to cause the one or more second processors to output the congestion control result to the one or more first processors through the network-on-a-chip, and wherein the one or more first processors are configured to control transmission of data packets to the second node over the packet datapath based on the congestion control result.

20. The system of claim 19, wherein the congestion control result indicates at least one of an inter-packet gap or a retransmission timeout, wherein the one or more first processors are configured to control transmission of data packets from the first node to the second node over the packet datapath according to the congestion control result.

* * * * *